United States Patent [19]
Gal et al.

[11] Patent Number: 5,600,486
[45] Date of Patent: Feb. 4, 1997

[54] COLOR SEPARATION MICROLENS

[75] Inventors: George Gal, Palo Alto; Bruce J. Herman, Mountain View, both of Calif.

[73] Assignee: Lockheed Missiles and Space Company, Inc., Sunnyvale, Calif.

[21] Appl. No.: 380,109

[22] Filed: Jan. 30, 1995

[51] Int. Cl.$^6$ .............................. G02B 5/18; G02B 27/42; G02B 27/10
[52] U.S. Cl. .................... 359/569; 359/568; 359/575; 359/641; 359/619
[58] Field of Search .................................. 359/565, 566, 359/567, 568, 569, 571, 574, 575, 641, 619

[56] References Cited

U.S. PATENT DOCUMENTS

| | | | |
|---|---|---|---|
| 3,957,354 | 5/1976 | Knop | 359/568 |
| 4,062,628 | 12/1977 | Gale | 359/568 |
| 4,082,438 | 4/1978 | Knop | 359/568 |
| 4,130,347 | 12/1978 | Knop | 359/568 |
| 4,417,784 | 11/1983 | Knop et al. | 359/568 |
| 4,506,949 | 3/1985 | Knop | 359/568 |
| 4,798,448 | 1/1989 | Van Raalte | 350/345 |
| 4,861,140 | 8/1989 | Lucitte et al. | 350/320 |
| 5,013,133 | 5/1991 | Buralli et al. | 350/162.11 |
| 5,098,184 | 3/1992 | Van den Brandt | 353/102 |
| 5,139,609 | 8/1992 | Fields et al. | 156/643 |
| 5,161,059 | 11/1992 | Swanson et al. | 359/565 |
| 5,270,859 | 12/1993 | Wirth et al. | 359/622 |

FOREIGN PATENT DOCUMENTS

| | | |
|---|---|---|
| 3191348A | 8/1991 | Japan. |
| 2179472 | 3/1987 | United Kingdom. |
| WO9400781 | 1/1994 | WIPO. |

OTHER PUBLICATIONS

H. Dammann, "Color Separation Gratings", Aug., 1978, *Applied Engineering*, vol. 17, No. 15.

Wada, Osamu, "Ion–Beam Etching of InP and Its Application to the Fabrication of High Radiance InGaAsP/InP Light Emitting Diodes", Oct., 1984, *J. Electrochem. Soc.: Solid–State Science and Technology*, vol. 131, 10.

George Gal, "Micro–optics Technology Development For Advanced Sensors" from proceedings of a conference held Jul. 12–13, 1993, San Diego, California and reprinted in *Critical Reviews of Optical Science and Technology*, vol. CR49, copyright 1994 by the Society of Photo–optical Instrumentation Engineers.

Michael W. Farn, Margaret B. Stern, Wilfrid B. Veldkamp, and Shirley S. Medeiros, "Color Separation by Use of Binary Optics", Aug. 1, 1993, *Optics Letters*, vol. 18, No. 15.

George Gal, B. Herman, W. Anderson, R. Whitney, and H. Morrow, "Micro–Optics Technology and Sensor Systems Applications", Aug., 1993, *NASA Conference Publication 3227* of Binary Optics Conference, Huntsville, Alabama (1993).

(List continued on next page.)

*Primary Examiner*—Jon W. Henry
*Attorney, Agent, or Firm*—Feix & Feix; Henry J. Groth

[57] ABSTRACT

A color separation microlens is fabricated to be a single micro-optical element made up of a color separation grating integrated with a refractive lens. The color separation microlens separates the spectrum into distinct color spots and focuses these spots to a common plane. The spots fall at the locations of the different diffraction orders of the grating. The color separation is done by the grating, and the focusing is done by the lens. The color separation microlens can be fabricated as a monolithically integrated element (an element in which the grating and the lens are combined to a single surface) and can also be fabricated as a dual-sided thin wafer (a wafer in which the grating is on one side and the lens is on the other).

18 Claims, 13 Drawing Sheets

COLOR SEPARATION MICROLENS

OTHER PUBLICATIONS

B. Herman and G. Gal, "Theory of Dispersive Microlenses", Aug., 1993, NASA Conference Publication 3227 of Binary Optics Conference, Huntsville, Alabama (1993).

W. W. Anderson, J. Marley, and G. Gal, "Fabrication of Micro-Optical Devices", Aug., 1993, *NASA Conference Publication 3227* of Binary Optics Conference, Huntsville, Alabama (1993).

D. Shough, B. Herman, and G. Gal, "Measurements of Microlens Performance", Aug., 1993, *NASA Conference Publication 3227* of Binary Optics Conference, Huntsville, Alabama (1993).

Michael W. Farn, Robert E. Knowlden, Margaret B. Stern, and Wilfrid B. Veldkamp, "Color Separation Gratings", Conference on Binary Optics, 1993.

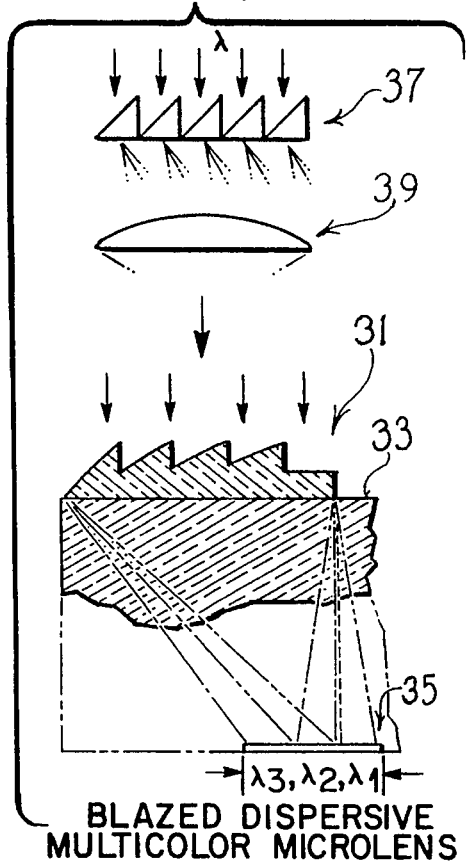

FIG_1 BLAZED DISPERSIVE MULTICOLOR MICROLENS

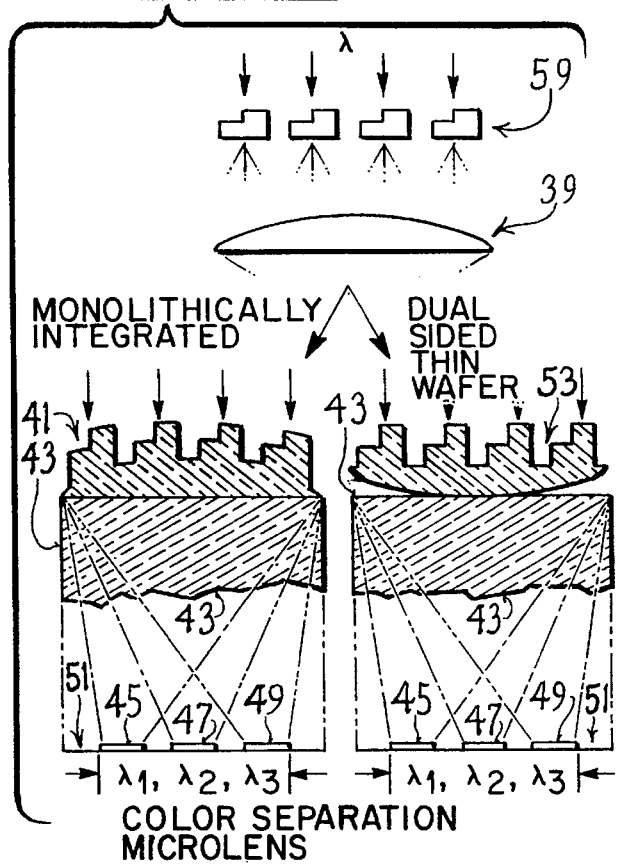

FIG_2 COLOR SEPARATION MICROLENS

FIG_3

|  | DISPERSIVE | COLOR SEPARATION MICROLENS |
|---|---|---|
| OPTICAL PEFORMANCE | • GOOD EFFICIENCY<br>• OVERLAPPING BLUR SPOTS | • HIGH EFFICIENCY<br>• EXCELLENT SPATIAL SEPARATION OF SPECTRAL BLUR SPOT |
| FOCAL PLANE LAYOUT | • DISPLACED ALONG DISPERSIVE AXIS | • CENTERED ON PIXEL |
| DESIGN OPTIONS | • MONOLITHICALLY INTEGRATED | • MONOLITHICALLY INTEGRATED<br>• DUAL SIDED THIN WAFER<br>• MORE DESIGN FREEDOM |
| FABRICATION OPTIONS | • BINARY GREYSCALE | • BINARY GREYSCALE |
| APPLICATIONS | • IR FOCAL PLANE | • VISIBLE FOCAL PLANE<br>• FLAT PANEL DISPLAY<br>• COLOR FAX MACHINE<br>• COLOR PICTURE PHONE<br>• CAMERA ON A CHIP<br>• CONFOCAL MICROSCOPE |

FIG_4
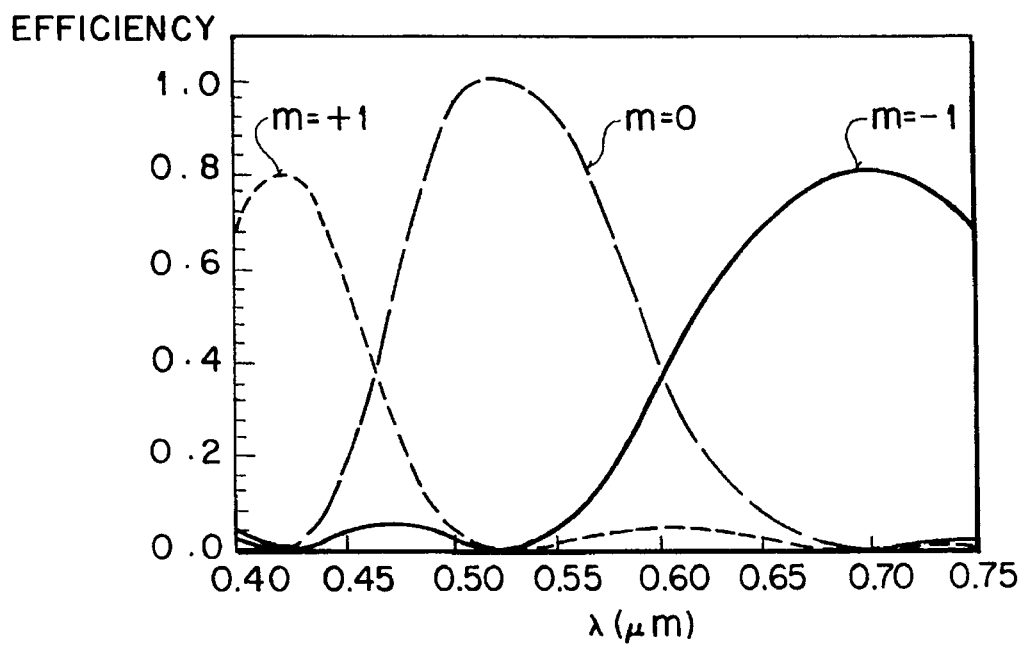
FIG_5
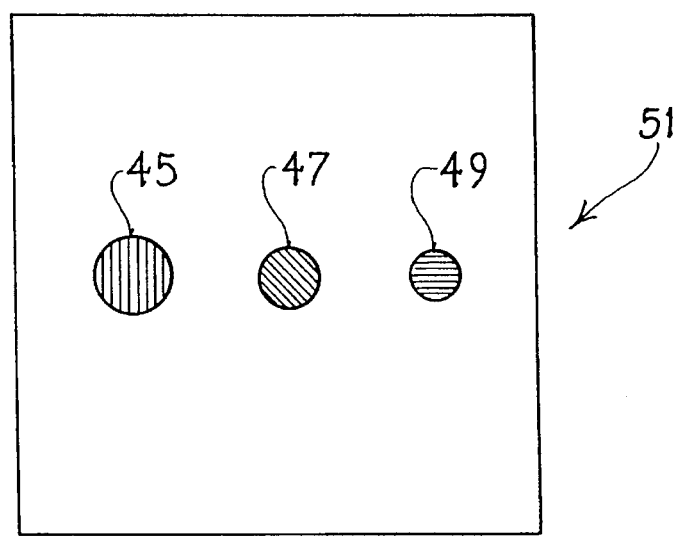

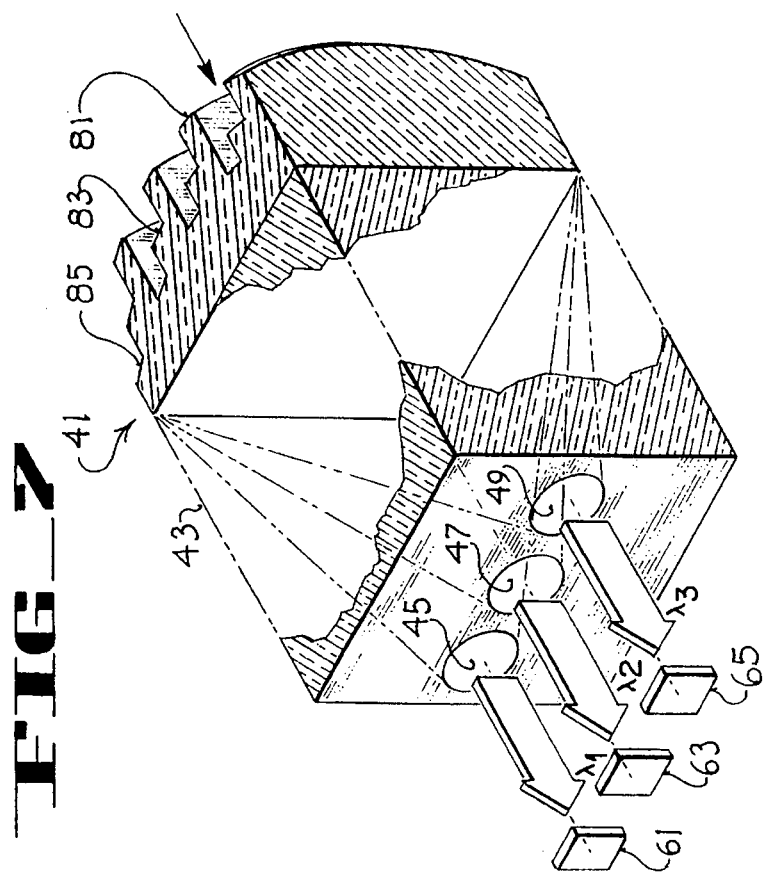
FIG_7
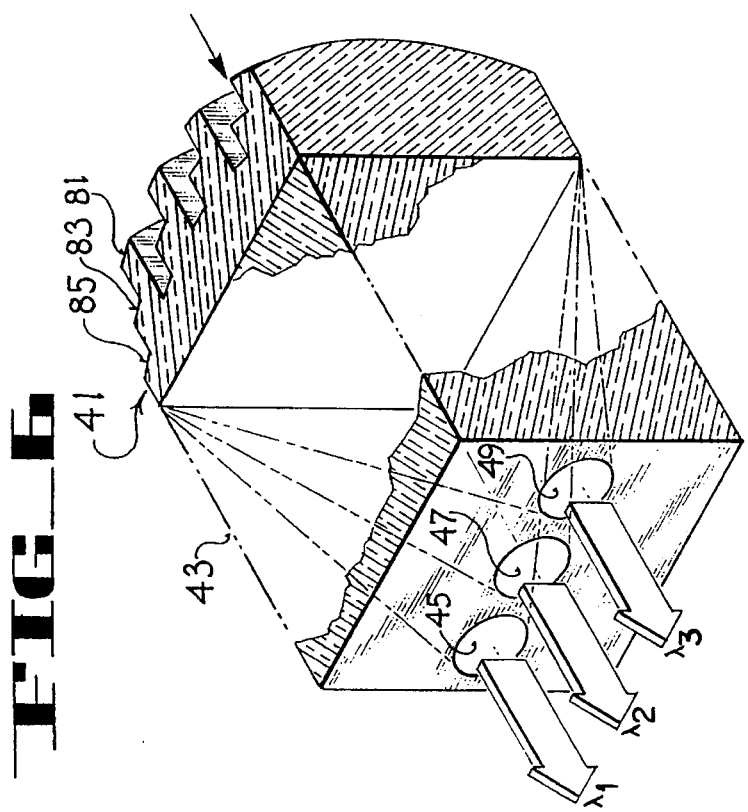
FIG_6

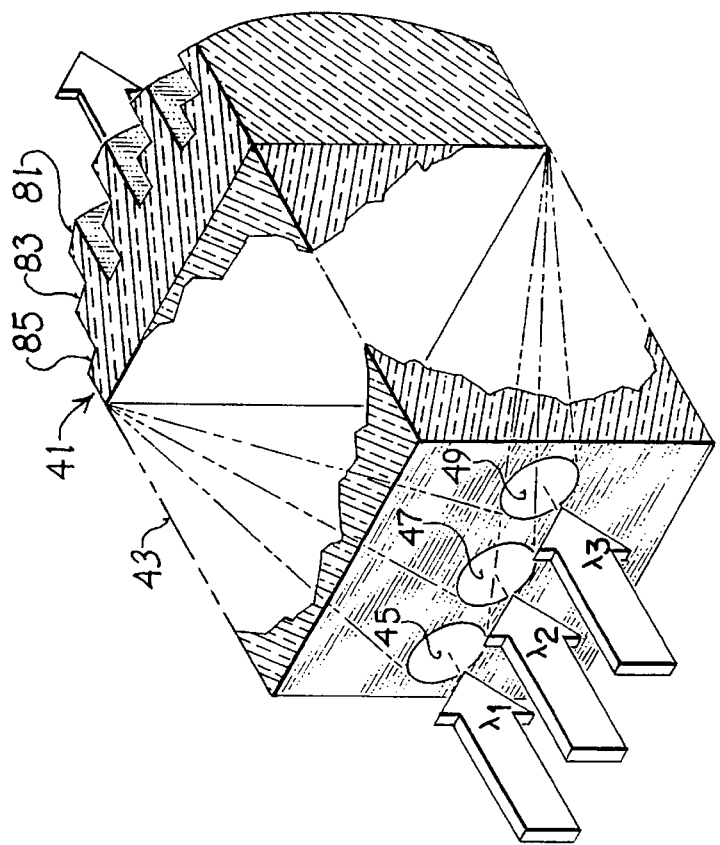
FIG_A
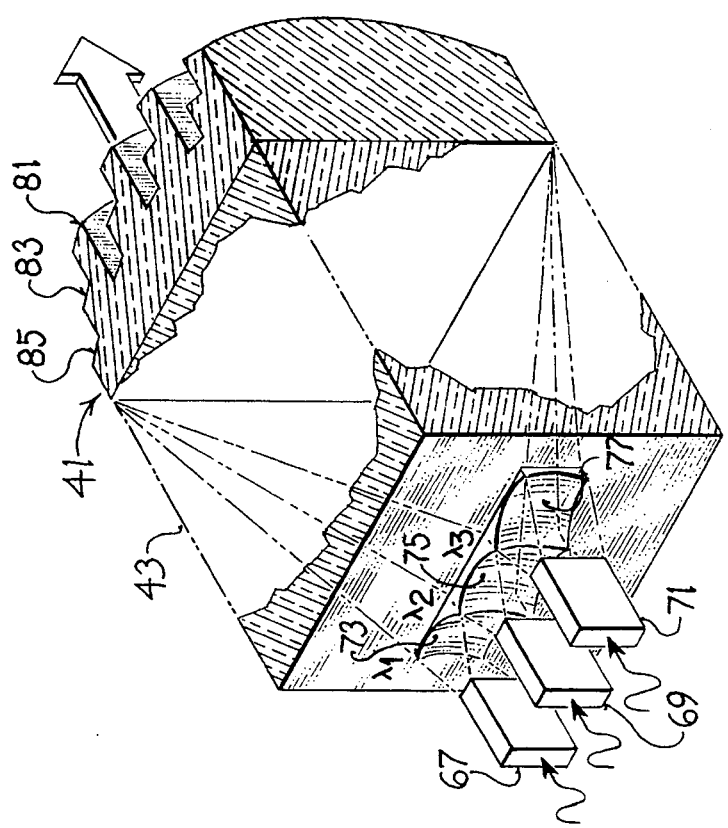
FIG_B

| APPLICATION | SENSOR | FLAT PANEL DISPLAY |
|---|---|---|
| WAVEBAND | 400 nm < λ < 750 nm | 400 nm < λ < 750 nm |
| SPOT SIZES (a, a¹, a¹¹) | ~6 μm | ~6 μm |
| SPOT SEPARATION (b, b¹) | ~12 μm | ~12 μm |
| PIXEL SIZE (c) | 50 μm | |
| SUBSTRATE THICKNESS (d) | 400 μm | |
| MAXIMUM ETCHING DEPTH (e) | 8.8 μm | 8.8 μm |

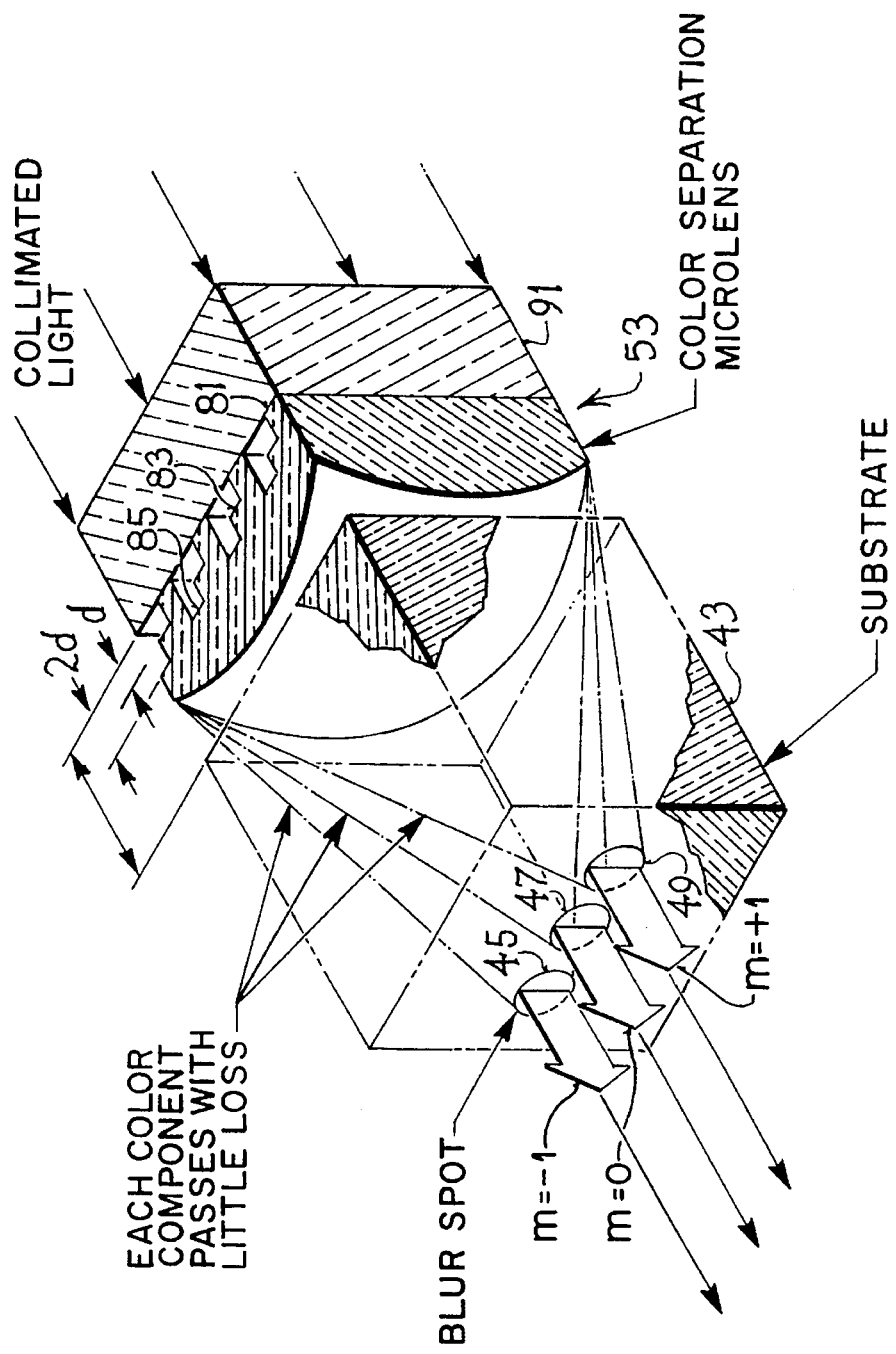
FIG_11

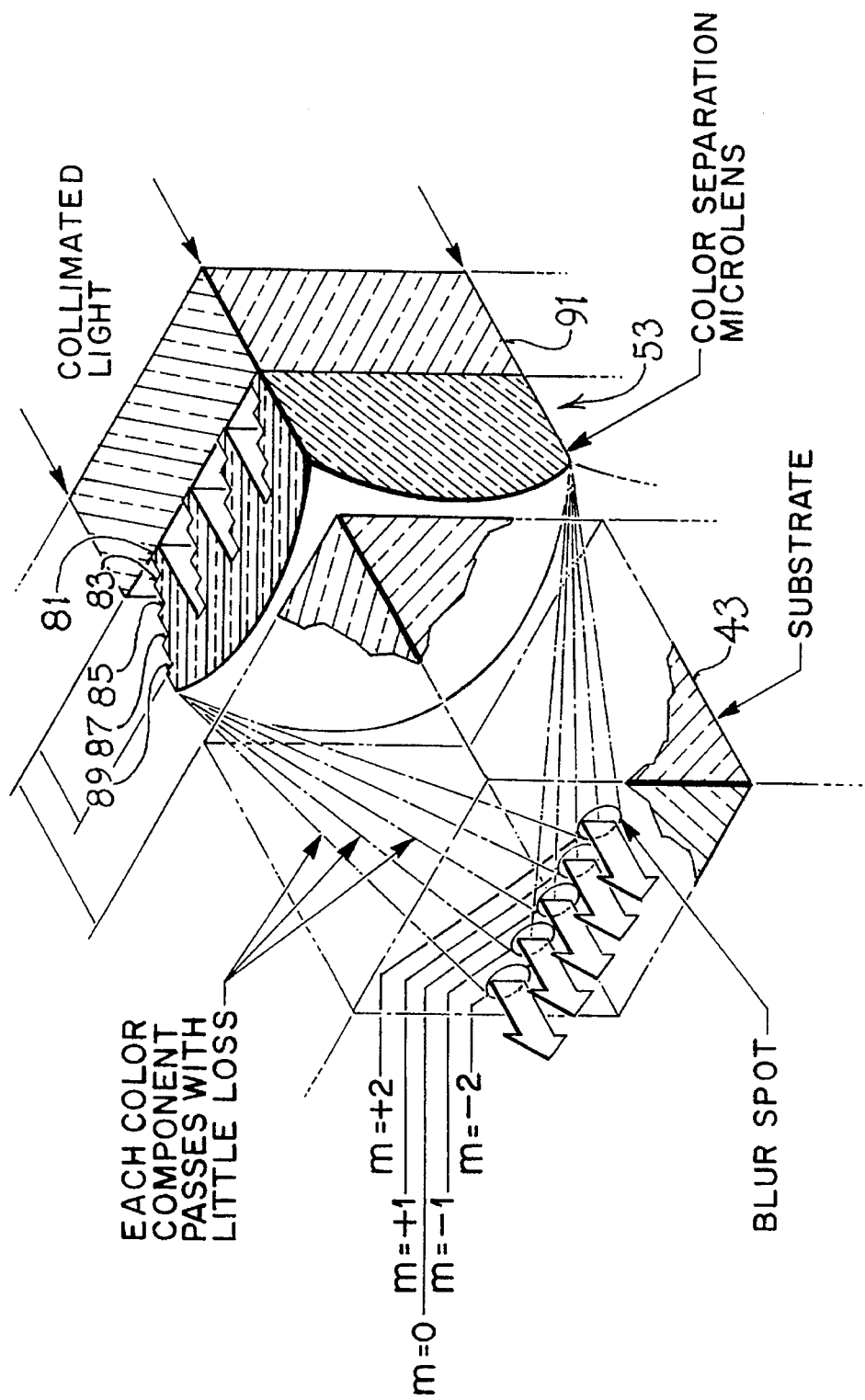
FIG_12

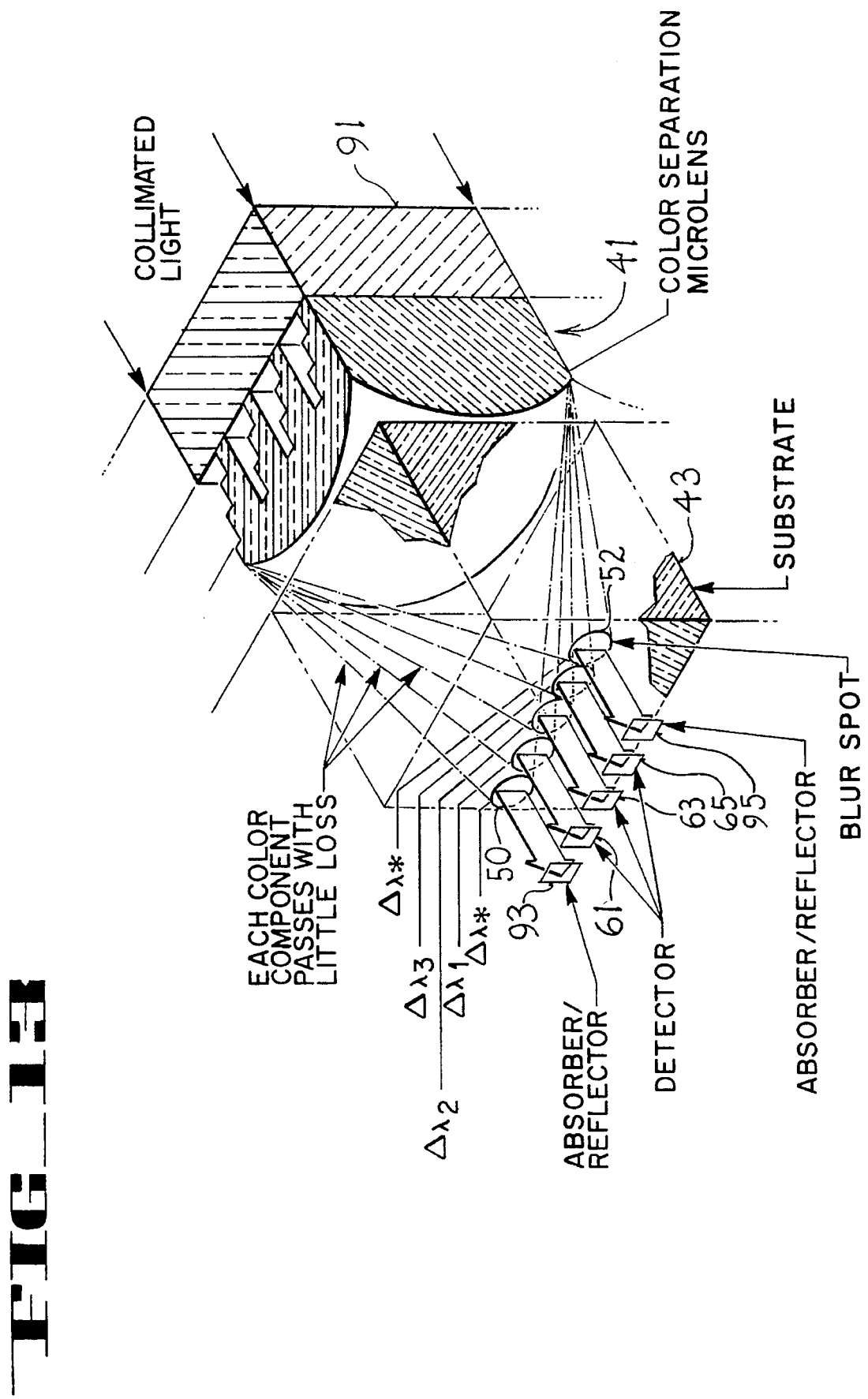
FIG_13

FIG_14
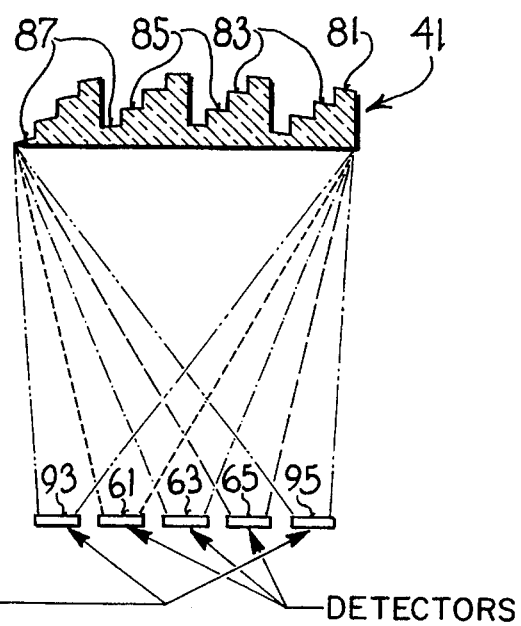
ABSORBER OR REFLECTOR — DETECTORS
FIG_15
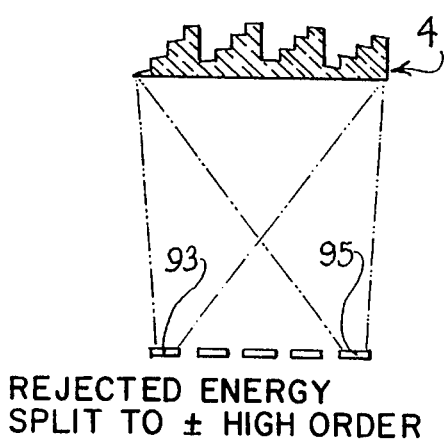
REJECTED ENERGY
SPLIT TO ± HIGH ORDER
FIG_16
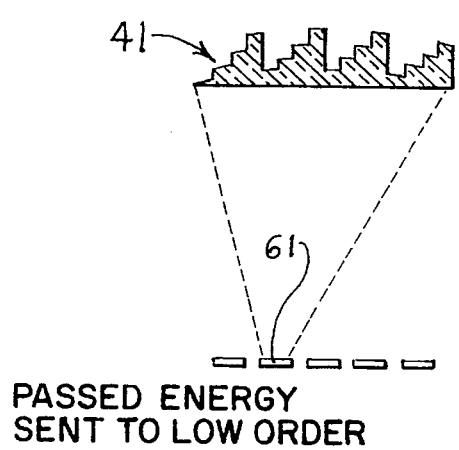
PASSED ENERGY
SENT TO LOW ORDER
FIG_17
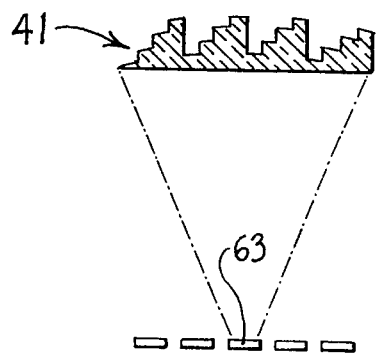
PASSED ENERGY
SENT TO LOW ORDER
FIG_18
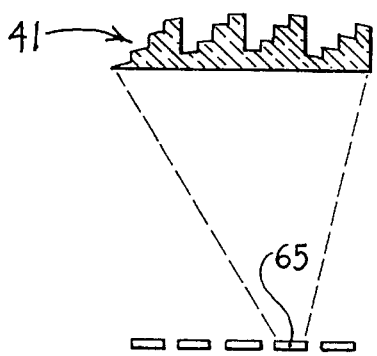
PASSED ENERGY
SENT TO LOW ORDER

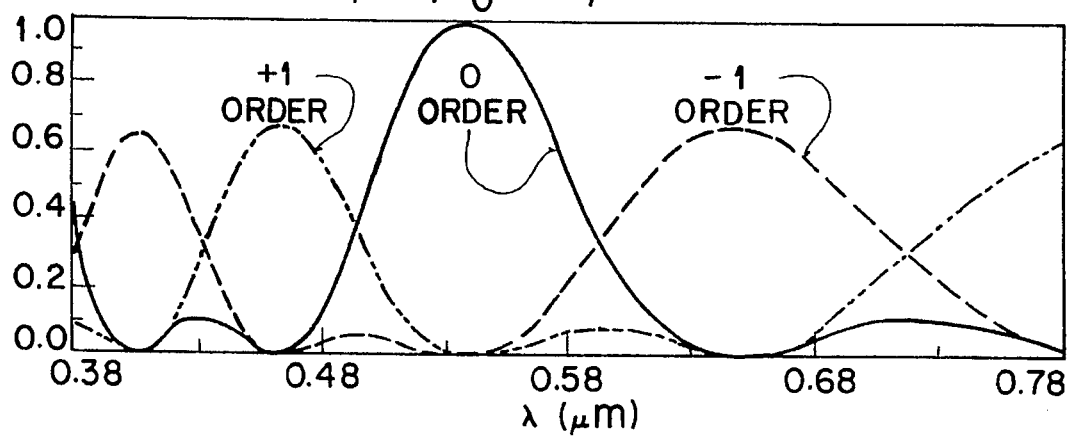
FIG_19
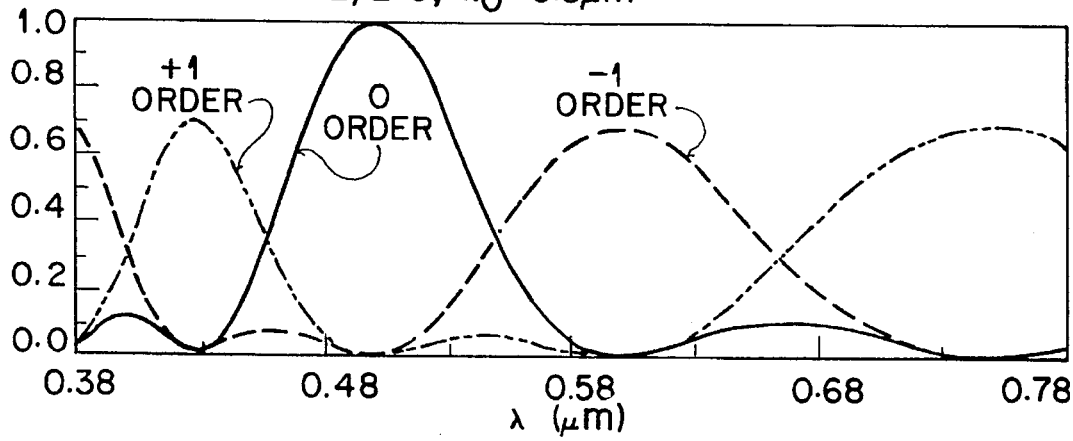
FIG_20
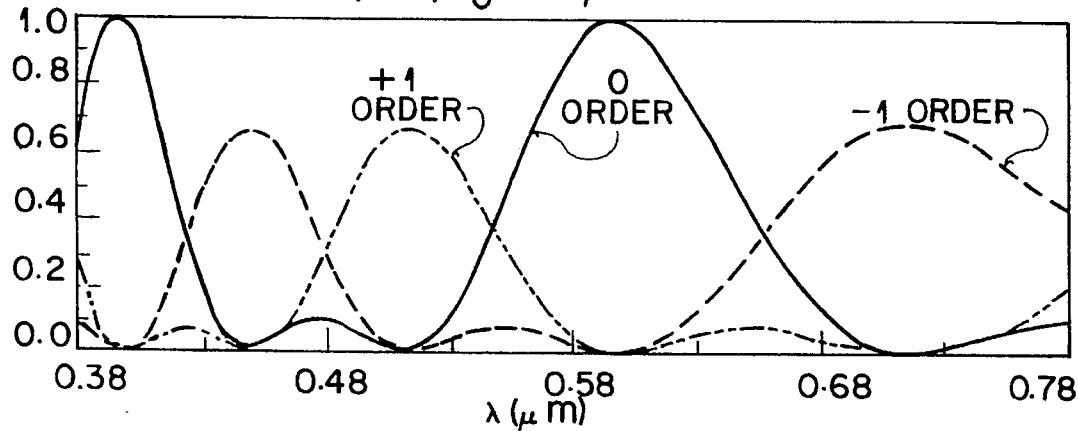
FIG_21

FIG_22
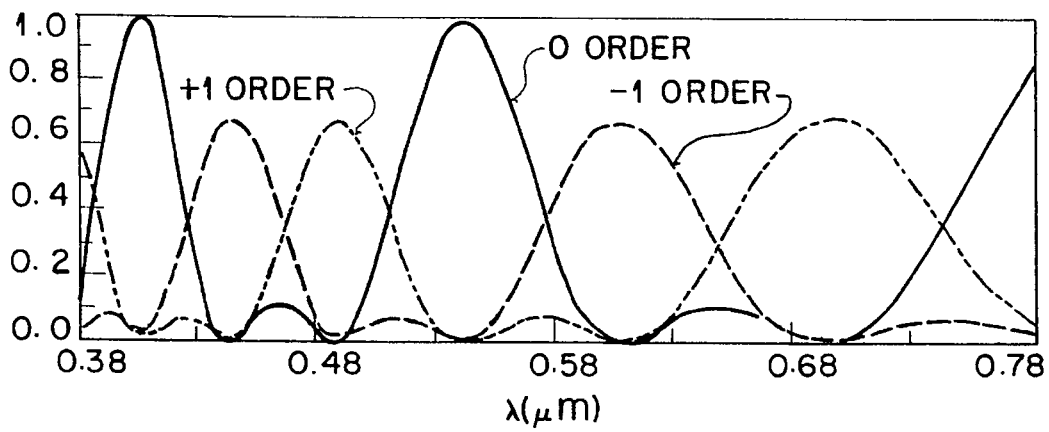
FIG_23
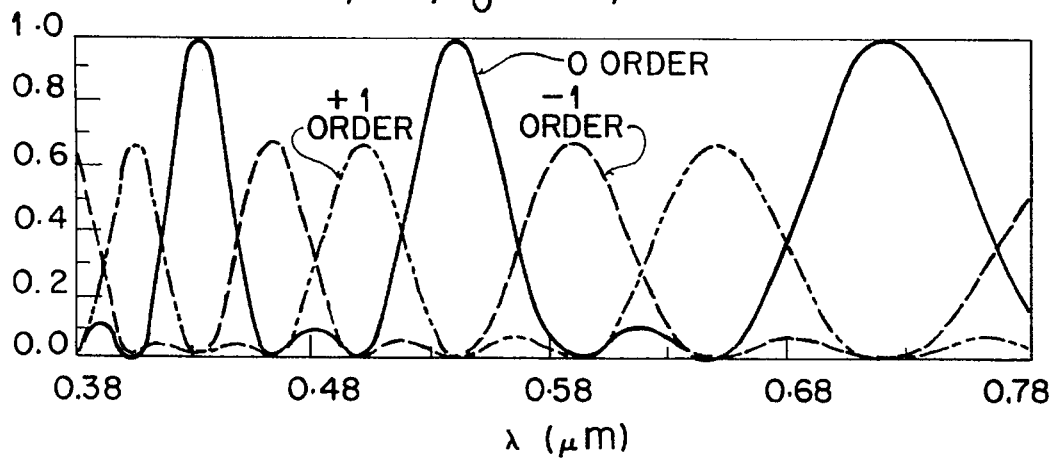

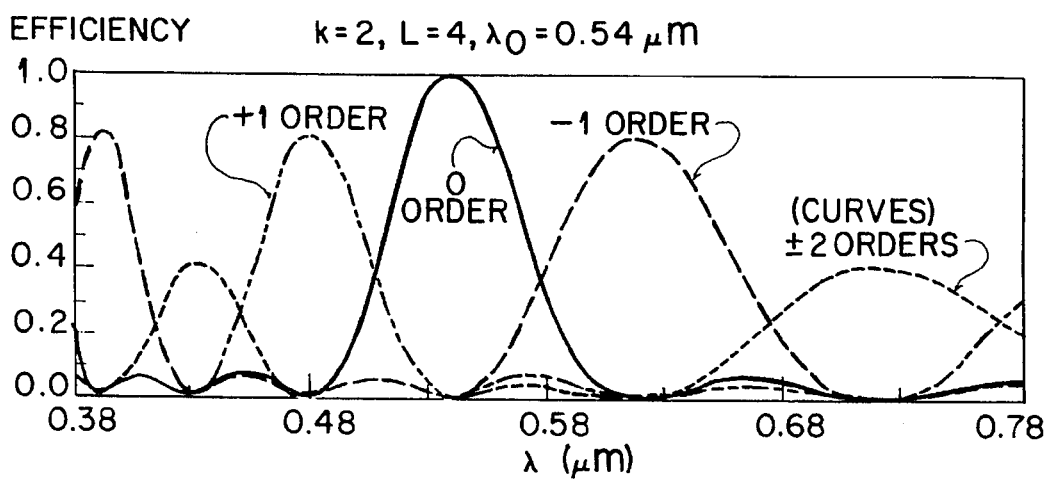
FIG_24
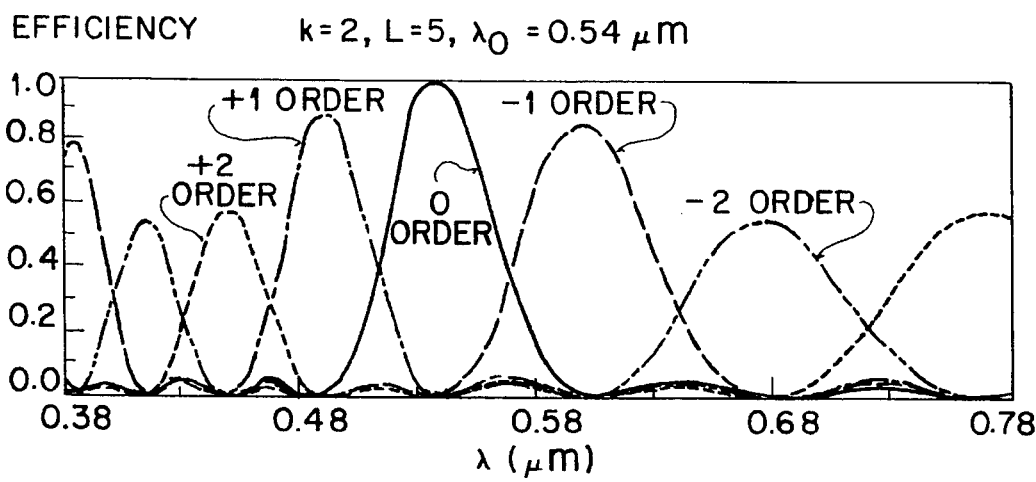
FIG_25
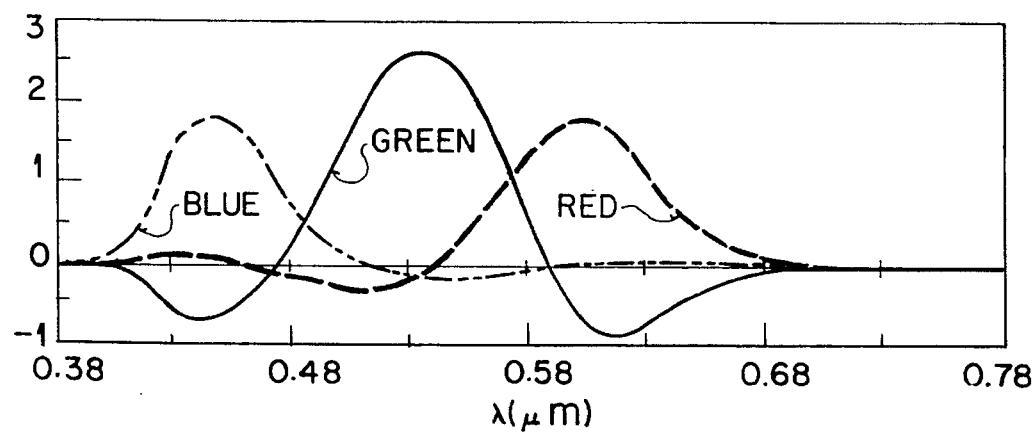
FIG_28

FIG_27
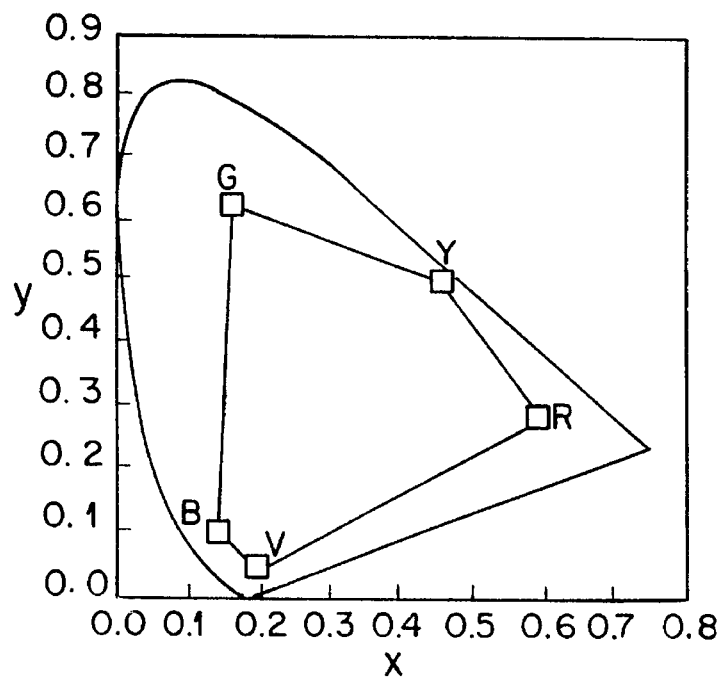
FIG_26
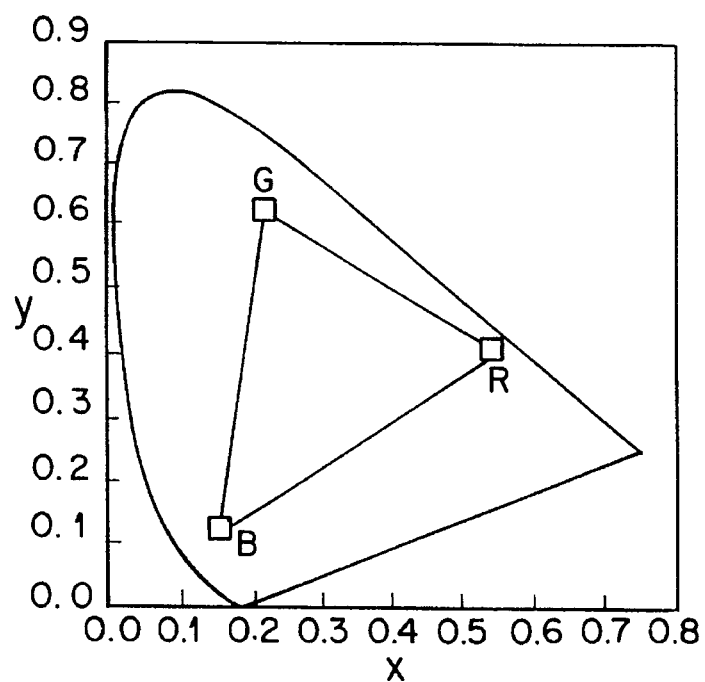

COLOR SEPARATION MICROLENS

BACKGROUND OF THE INVENTION

This invention relates to a dispersive microlens.

This invention relates in particular to a color separation microlens which is a single micro-optical element made up of a color separation grating which disperses color by orders and which is integrated with a refractive lens.

The color separation microlens separates the spectrum into distinct color spots and focuses these spots to a common plane. The spots fall at the locations of the different diffraction orders. The color separation is done by the grating and the focusing is done by the lens.

The color separation microlens of the present invention is an improvement over a blazed dispersive microlens disclosed in co-pending U.S. application Ser. No. 07/904,316 filed Jun. 25, 1992, by George Gal, inventor, and entitled "Dispersive Microlens".

The blazed dispersive microlens disclosed in co-pending U.S. application Ser. No. 07/904,316 is a single micro-optical element made up of a blazed diffraction integrated onto the surface of a refractive lens.

The blazed dispersive microlens stretches the colors of the incoming light from blue to red in a single diffraction order and focuses the light down to a single diffraction spot.

The blazed dispersive microlens separates colors into a single diffraction order.

The color separation microlens of the present invention separates colors into distinct blur spots in different diffraction orders.

The blazed diffraction microlens performs a linear stretch of color from one end of the waveband to the other.

The color content of the blur spots of the color separation microlens contains contributions from all the wavelengths in the spectral band, with the weighting of the spectral content dependent on the diffraction order.

SUMMARY OF THE INVENTION

The color separation microlens of the present invention is a single micro-optical element made up of a color separation grating integrated with a refractive lens.

The color separation microlens separates the color spectrum into distinct color spots and focuses these spots to a common plane.

The spots fall at the locations of the different diffraction orders.

The color separation is done by the grating, and the focusing is done by the lens.

The color separation microlens of the present invention embodies two different fabrication options.

The color separation microlens can be fabricated as a monolithically integrated element in which the grating and the lens are combined to a single surface.

The color separation microlens can also be fabricated as a dual-sided, thin wafer with the color separation grating on one side and the focusing lens surface on the other side of the dual-sided, thin wafer.

The color separation microlens of the present invention provides the ability to control the spectral content of different diffraction orders.

The separation of the color spots produced by the color separation microlens of the present invention enables the color separation microlens to be used in a number of applications which require color separation. These applications include, but are not limited to, a visible focal plane, a flat panel display, a color fax machine, a color picture phone, a camera on a chip, and a confocal microscope.

The color separation microlens of the present invention can also be used to blend the primaries to achieve a desired color.

The color separation microlens of the present invention is constructed in accordance with a design equation which is actually the equation that describes the spectral efficiencies for a particular design.

The efficiency curve for the mth order is given by the equation:

$$\eta_m(\lambda) = \left\{ \mathrm{sinc}(m/L) \frac{\sin[L\pi(k\bar{\lambda}/\lambda - m/L)]}{L\sin[\pi(k\bar{\lambda}/\lambda - m/L)]} \right\}^2$$

where m is the diffraction order number, k is the overphasing parameter (always an integer), L is the number of steps in a period of the grating, and $\bar{\lambda}$ is the "design" wavelength.

This equation will be discussed in more detail below under the Detailed Description of the Preferred Embodiments.

Color separation microlens apparatus and methods which incorporate the features described above and which are effective to function as described above constitute specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a diagrammatic and cross-sectional view which illustrates principles of operation and structure of a single, unitary, micro-optical element made up of a blazed diffraction grating integrated onto the surface of a refractive lens. The construction shown in FIG. 1 is disclosed and claimed in prior application Ser. No. 07/904,316 filed Jun. 25, 1992 and assigned to the same assignee as the assignee of this application.

FIG. 2 is a diagrammatic view, like FIG. 1, but shows two embodiments of a color separation microlens constructed in accordance with the present invention.

In the embodiment shown at the left hand side of FIG. 2 the color separation microlens is a monolithically integrated micro-optical element. In this embodiment a color separation grating separates colors of a spectral band by diffraction orders, and a lens surface focuses the separated colors to separate, distinct spots in a common focal plane (the plane shown at the bottom left hand side of FIG. 2). In this monolithically integrated embodiment, the grating and the lens surface are combined to a single surface.

In the other embodiment shown in FIG. 2 (the embodiment shown at the right hand side of FIG. 2) the grating is formed on one side of a dual-sided thin wafer, and the focussing lens surface is formed on the other side of the dual-sided thin wafer.

FIG. 3 is a table which compares certain features of the blazed dispersive microlens shown in FIG. 1 with certain features of the color separation microlens shown in FIG. 2. The right hand column of FIG. 3 notes several novel features of the color separation microlens of the present invention.

FIG. 4 is graph showing an example of (spectral) efficiency curves for a color separation microlens constructed in accordance with the present invention. Each curve in FIG. 4 represents the efficiency for a different order. The plots shown in FIG. 4 show what fraction of light at a given wavelength is sent to each order.

FIG. 5 is a plan view of diffraction spots produced at a focal plane (the lowermost plane shown in FIG. 2). The diffraction spots in FIG. 5 are lined to represent the different colors (e.g., red-green-blue colors) produced in the diffraction spots for an color separation microlens whose efficiency curves are those shown in FIG. 4.

FIG. 6 is an isometric view of a color separation microlens constructed in accordance with one embodiment of the invention (the monolithically integrated embodiment illustrated at the left hand side of FIG. 2). FIG. 6 illustrates one mode of operation in which the color separation microlens separates the spectrum of incoming light into distinct color spots.

FIG. 7 is a view like FIG. 6 but showing how, in another mode of operation, detectors are used at the separate, distinct diffraction spots to detect and/or to measure the energy in each separate color spot.

FIG. 8 is an isometric view like FIGS. 6 and 7 but illustrating how the color separation microlens of the present invention is used in another mode of operation to combine and to blend colors from distinct sources. In FIG. 8 the color sources are individual light emitting diodes. The diodes and associated optics provide angular distributions of light to correspond to light from different diffraction orders. The color separation microlens of the present invention blends the incoming orders to produce an outgoing spectral band (indicated by the block arrow in FIG. 8) at the upper, outlet face of the color separation microlens.

FIG. 8A is an isometric view like FIGS. 6, 7 and 8, but showing another mode of operation of a color separation microlens constructed in accordance with the present invention. In FIG. 8A the incoming light sources which are combined and blended are general, unspecified light sources (as indicated by the block arrows in FIG. 8A) rather than being specific light-emitting diodes and related optics as shown in FIG. 8.

Figure 9:
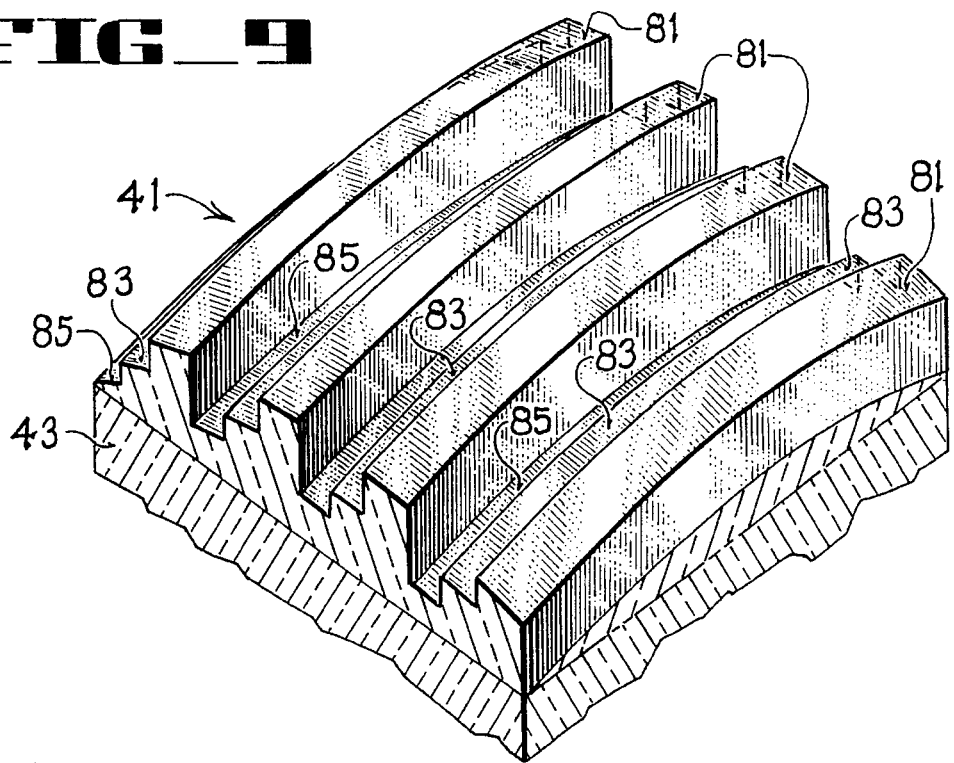

FIG. 9 is a fragmentary, isometric view of the top surface of the monolithically integrated color separation microlens shown at the left hand side of FIG. 2 and also shown in FIGS. 6–8A. FIG. 9 presents an upper, isometric view of the grating periods and shows how each grating period, in this particular embodiment of the present invention, has spaced steps in the grating period.

Figure 10:
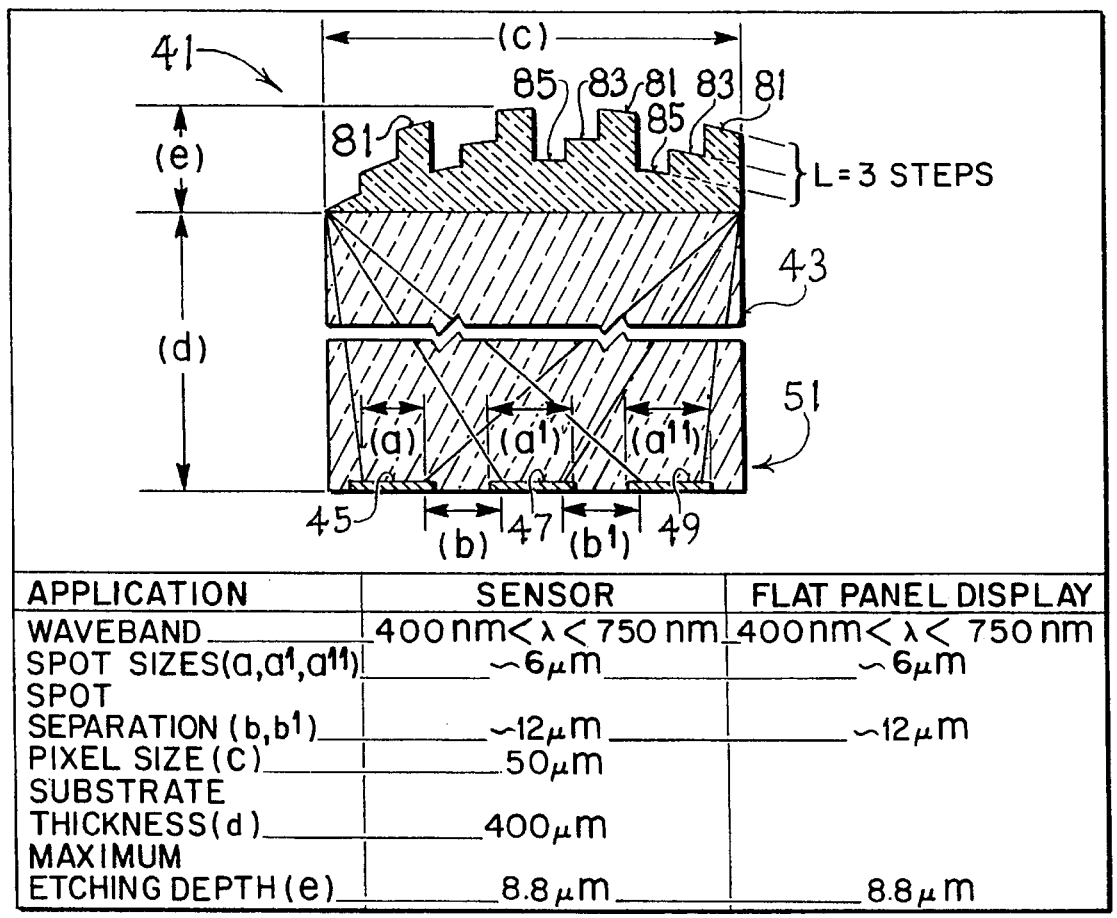

FIG. 10 is a cross sectional view of a monolithic integrated color separation microlens constructed in accordance with the embodiment of the invention shown in the left hand side of FIG. 2. FIG. 10 also contains a table (at the bottom of FIG. 10) which discloses dimensions for typical applications of the particular embodiment of the color separation microlens (shown at the top of FIG. 10).

FIG. 11 is an isometric view similar to FIG. 6 but showing a color separation microlens constructed in accordance with the dual-sided, thin wafer embodiment of the present invention (the embodiment shown on the right hand side of FIG. 2). FIG. 11, like FIG. 6, illustrates a mode of operation in which the color separation microlens separates the spectrum of incoming light to distinct color spots. In FIG. 11, each grating period has three spaced steps and produces three diffraction orders.

FIG. 12 is an isometric view showing the dual-sided, thin wafer, color separation microlens embodiment of the present invention. There are five steps in each grating period of the embodiment shown in FIG. 12, and the color separation microlens produces five diffraction orders.

FIG. 13 is a isometric view like FIGS. 11 and 12, but FIG. 13 shows a special case embodiment of the color separation microlens of the present invention in which the high order is split and sent in equal intensities to the two outermost spots. In this special case embodiment, the high order can then be reflected or absorbed so as to be rejected or eliminated.

FIG. 14 is a side elevation, cross-sectional view through a monolithically integrated color separation microlens of the present invention. Each grating period in the embodiment shown in FIG. 14 has four steps, and the color separation microlens produces five diffraction orders. The color separation microlens construction shown in FIG. 14 produces five separate, distinct, focused spots. The efficiencies for the two outer spots are identical. FIG. 14 shows how absorbers or reflectors can be placed at the outer spots to totally absorb or to totally reflect the ±2 orders. Detectors are placed at the three central spots in this embodiment of the present invention.

FIGS. 15, 16, 17 and 18 are side elevation, cross-sectional views of the embodiment shown in FIG. 14, but each of FIGS. 15, 16, 17 and 18 has been simplified to illustrate how light from a single, particular order is transmitted through the color separation microlens and to the focused, diffraction spot at the focal plane.

FIG. 15 shows how the energy to be rejected is confined to the outer orders and is split to equal intensity spots at the outer ends of the line of spots at the focal plane so that this light can be rejected.

FIGS. 16, 17 and 18 show how energy passed through each of the other three orders is directed to related ones of the central spots for detection and/or measurement.

FIG. 19 is a graph which shows the efficiency curves for certain parameters of the design equation for a particular design of a color separation microlens constructed in accordance with the present invention. The efficiency curves are shown in FIG. 19 for the parameters k=2, L=3, and $\bar{\lambda}$=0.54 micrometers.

FIGS. 20 and 21 are graphs like FIG. 19 but showing the effect of altering the parameter $\bar{\lambda}$ in the efficiency curve. FIGS. 20 and 21 show in particular that changing the value of $\bar{\lambda}$ changes the relative positions of the efficiency curves. The value of $\bar{\lambda}$ denotes the wavelength at which the peak value of the zero order efficiency curve will lie. The parameters for FIG. 20 are k=2, L=3, and $\bar{\lambda}$=0.5 micrometers. The parameters for FIG. 21 are k=2, L=3, and $\bar{\lambda}$=0.6 micrometers.

FIGS. 22 and 23 are graphs like FIGS. 19–21 but show the effect of altering the parameter k (which is always an integer). These FIGS. 22 and 23 show in particular that as k is increased the efficiency curves are compressed toward $\bar{\lambda}$. Not shown, but also true, is the fact that when k is decreased, the efficiency curves expand around $\bar{\lambda}$. The parameters for FIG. 22 are k=3, L=3, and $\bar{\lambda}$=0.5 micrometers. The parameters for FIG. 23 are k=4, L=3, and $\bar{\lambda}$=0.54 micrometers. The widths of the efficiency curves are controlled by the parameter k.

FIGS. 24 and 25 are graphs like FIGS. 19–23 but show the effect of altering the parameter L (an integer). FIGS. 24 and 25 show in particular that only orders whose magnitudes are less than or equal to L/2 ($|m| \leq L/2$) have significant efficiency amplitudes. When L is even, the $\pm L/2$ orders have identical efficiency curves. The parameters for FIG. 24 are k=2, L=4, and $\bar{\lambda}$=0.54 micrometers. The parameters for FIG. 25 are k=2, L=5, and $\bar{\lambda}$=0.54 micrometers. The orders which have significant efficiency amplitudes are controlled by the parameter L.

FIG. 26 is a graph which shows the chromaticities of the spots produced by a color separation microlens designed to give a maximum color gamut with three primaries. The primaries correspond to red, green and blue colors. Any color which lies within the color gamut (i.e., within the polygon with vertices described by the primaries) can be reproduced for display by appropriately adjusting the amounts of the primaries. The calculation made to design this element assumed that the element was illuminated by an equal energy spectrum (i.e., an equal amount of energy at each wavelength across the visible band). If the spectrum of the illuminating light can be controlled (e.g., by choosing proper phosphors for a flurorescent lamp) then an even larger color gamut can be obtained. Controlling the spectrum of the illuminating light gives a larger design freedom for the color gamut.

FIG. 27 is a graph like FIG. 26 but showing the chromaticities of the spots produced by a color separation microlens designed to give a maximum color gamut with five primaries. The primaries correspond to red, yellow, green, blue and violet colors.

FIG. 28 is a graph which shows the color matching curves corresponding to a color separation microlens which has the efficiency curves of FIG. 26.

DESCRIPTION OF THE PREFERRED EMBODIMENTS

In the detailed description to follow, the terms "spectrum", "red", "green", "blue" and "color" will be used in connection with the description of the certain features of the invention. These terms will often be used for simplifying the detailed descriptions of the various embodiments of the invention, and some preliminary comments regarding these terms will be helpful to an understanding of the invention. Throughout the detailed description there will be a frequent need to refer to the "spectrum" of incoming light. In specific embodiments of the invention as shown in certain of the drawing views, the term "spectrum" will be used in respect to the visible spectrum (0.38 micrometers to 0.78 micrometers).

The color separation microlens can be used for other wavelength bands (e.g., short wavelength infrared, medium wavelength infrared, long wavelength infrared); so the term "spectrum" is not limited to the visible spectrum.

The terms "red", "green", and "blue" specifically refer to colors in the visible band, but these terms more generally can be associated with the long, mid, and short wavelengths of a different spectral band.

The term "color" will likewise be used to specify different regions of the wavelength band.

The color separation microlens of the present invention is a single, micro-optical element made up of a color separation grating (originally introduced by H. Dammann; see the article entitled "ColorSeparation Gratings" in the 1 Aug. 1978, Vol. 17, No. 15 edition of Applied Optics at pages 2273–2279) integrated with a refractive lens. This H. Dammann article is incorporated by reference in this application.

The color separation microlens of the present invention separates the spectrum into distinct color spots and focuses these spots to a common plane. The spots fall at the locations of the different diffractive orders. The color separation is done by the grating, and the focusing is done by the lens.

The present invention is an improvement over a blazed dispersive microlens disclosed and claimed in prior application Ser. No. 07/904,316 filed Jun. 25, 1992 by George Gal and assigned to the same assignee as the assignee of this application. The prior, blazed dispersive microlens is a single, micro-optical element made up of a blazed, diffraction grating integrated onto the surface of a refractive lens. The blazed, dispersive microlens stretches the colors of the incoming light from blue to red in a single diffraction order and focuses the light down to a single diffraction spot.

FIG. 1 is a diagrammatic and cross-sectional view which illustrates principles of operation and structure of a single, unitary, micro-optical element made up of a blazed diffraction grating integrated onto the surface of the refractive lens (as disclosed and claimed in prior application Ser. No. 07/904,316 filed Jun. 25, 1992).

In FIG. 1, a blazed, dispersive microlens 31 is shown mounted on a substrate 33. The blazed, dispersive microlens 31 stretches the colors of the incoming light from blue to red in a single diffraction order and focuses the light down to a single diffraction spot 35.

The blue, green, and red colors within the single diffraction spot are indicated by the $\lambda_1$, $\lambda_2$, $\lambda_3$ characters below the single diffraction spot 35.

The top part of FIG. 1 illustrates how a blazed diffraction grating 37 and a focusing refractive lens 39 (as functional components) are incorporated within the single, upper surface of the unitary blazed dispersive microlens 31 shown in FIG. 1.

FIG. 2 is a diagrammatic and cross-sectional view like FIG. 1 that shows two embodiments of a color separation microlens constructed in accordance with the present invention.

The color separation microlens of the present invention is a single, micro-optical element made up of a color separation grating (originally introduced by H. Dammann as noted above) integrated with a refractive lens. The color separation microlens of the present invention separates the spectrum into distinct color spots and focuses these spots to a common plane. The spots fall at the locations of different diffraction orders. The color separation is done by the order dispersive grating and the focusing is done by the refractive lens.

FIG. 2 shows two different fabrication embodiments of the color separation microlens of the present invention.

In the embodiment shown at the left hand side of FIG. 2, the color separation microlens 41 is a monolithically integrated micro-optical element. In this embodiment, the grating and the lens are combined to a single, upper surface; and the flat lower surface of the color separation microlens is mounted on a substrate 43. The color separation microlens 41 separates the spectrum into distinct color spots 45, 47 and 49 in the common plane 51.

In the other embodiment 53 shown in FIG. 2 (the embodiment shown at the right hand side of FIG. 2), the grating is formed on one side of a dual-sided thin wafer (the upper side as illustrated) of a dual-sided thin wafer; and the focusing lens surface is formed on the other side (the lower side as illustrated) of the dual-sided thin wafer.

The color separation microlens 53 is shown mounted on a substrate 43.

The color separation microlens 53 separates the spectrum into distinct color spots 45, 47 and 49 and focuses these spots to a common plane 51.

As in the upper part of FIG. 1, the upper part of FIG. 2 illustrates how a color separation grating 59 is functionally associated with a refractive lens 39 in the single, unitary, color separation microlens embodiments 41 and 53.

There are two main differences between the color separation microlens shown in FIG. 2 and the blazed dispersive microlens shown in FIG. 1.

First, the blazed dispersive microlens separates colors in a single diffraction order.

The color separation microlens shown in FIG. 2 separates colors into distinct blur spots and different diffraction orders.

Second, the blazed dispersive microlens performs a linear stretch of color from one end to the waveband to the other.

The color content of the blur spots of the color separation microlens contain contributions from all wavelengths in the spectral band, with the weighting of the spectral content dependent on the diffraction order.

Generally speaking, the color separation of the color separation microlens is less pure than that of the blazed dispersive microlens.

The color separation microlens offers more design freedom than the blazed dispersive microlens.

FIG. 3 is a table which compares certain features of the blazed dispersive microlens shown in FIG. 1 with certain features of the color separation microlens shown in FIG. 2.

The right hand column of FIG. 3 notes several novel features of the color separation microlens of the present invention.

FIG. 4 is a graph showing an example of (spectral) efficiency curves for a color separation microlens constructed in accordance with the present invention.

Each curve in FIG. 4 represents the efficiency for the particular order indicated by the label for that curve.

The plots show what fraction of light at a given wavelength is sent to each order and is read as follows:

Choose a wavelength along the bottom axis.

Draw a vertical line at that wavelength from the bottom to the top of the plot.

At each point where the vertical line intersects one of the efficiency curves, read off the value of the height of the intersection from the vertical axis.

This value is a fraction of incident light at that wavelength which goes into the order whose efficiency curve has been intersected by the vertical line.

As an example, at $\lambda=0.60$ micrometers, the efficiencies of the $-1$, 0, and $+1$ orders are read to be 0.35, 0.43 and 0.06, respectively. Thus, 84% of the incident light at 0.60 micrometers gets into the three central orders. The other 16% of light is sent to higher orders (not shown in FIG. 4). The design parameters for the color separation microlens whose efficiencies are shown in this FIG. 4 where $k=1$, $L=5$, $\bar{\lambda}=0.525$ micrometers. The meaning of these parameters will be discussed in more detail below with respect to the design equation for the color separation microlens that describes the spectral efficiencies for a particular design.

FIG. 4 introduces the efficiency curves for a color separation microlens constructed in accordance with the present invention. An understanding of the efficiency curves is essential in the design of a color separation microlens.

FIG. 4 illustrates the ability to control the spectral content of different diffraction orders in a color separation microlens constructed in accordance with the present invention.

FIG. 5 is a plan view of diffraction spots produced at a focal plane 51 (the lower most plane shown in FIG. 2). The diffraction spots 45, 47, and 49 shown in FIG. 5 are lined to represent the different colors (e.g., red, green, and blue colors) produced in the diffraction spots for a color separation microlens whose efficiency curves are those shown in FIG. 4. It should be noted that the spot separation and spot sizes are not uniform.

FIG. 5 demonstrates a typical result of physical spot color separation obtained with a color separation microlens constructed in accordance with the present invention.

The spot separation is a novel and important function and is an important benefit of the color separation microlens of the present invention.

FIG. 6 is an isometric view showing how a monolithically integrated microlens 41 (the embodiment shown in the left hand side of FIG. 2) is used in one mode of operation. Use in this mode is to separate the spectrum of the incoming light into distinct color spots 45, 47 and 49.

This mode of operation can be used for a device which requires a color display. The separate spots can be used as color primaries (e.g., red, green and blue).

FIG. 7 shows the monolithically integrated microlens 41 used in another mode of operation. In this mode of operation, the energy in each color spot is detected and/or measured by respective detectors 61, 63 and 65.

This mode of operation can be used for a device used to measure color content of an image (e.g., pickups for a color camera). The separately detected energies can be used to calculate the tristimulus values for a color in the image - - - the color in an image obtained from use of an array of the color separation microlenses 41.

FIG. 8 shows another mode of operation of an color separation microlens constructed in accordance with the present invention. In the use of the monolithically integrated microlens 41 shown in FIG. 8, the color separation microlens blends colors from distinct sources into a single color.

In the embodiment shown in FIG. 8, the color sources are light emitting diodes 67, 69 and 71, and each light emitting diode is associated with a related optic 73, 75 and 77 to provide the proper angular distribution of light to correspond to light from different diffraction orders.

FIG. 8A illustrates a use like the use shown in FIG. 8, but in FIG. 8A the light sources are unspecified (rather than being specific light emitting diodes in related optics as shown in FIG. 8).

In both FIG. 8 and FIG. 8A, the color separation microlens blends the incoming orders to produce an outgoing spectral band (indicated by the block arrow at the upper right hand ends of FIG. 8 and FIG. 8A).

The modes of operation illustrated in FIG. 8 and FIG. 8A can be used for a color display device where the individual display primaries are within the resolution of the human eye. The color separation microlens can be used to blend the primaries to achieve a desired color to combat the resolution issue.

FIG. 9 is a fragmentary, isometric view showing details of the top surface of the monolithically integrated color separation microlens 41.

FIG. 9 shows details of the grating periods, and shows how each grating period, in this particular embodiment illustrated in FIG. 9, has three spaced steps, 81, 83 and 85 in the grating period.

FIG. 10 is a cross-sectional view of the monolithically integrated color separation microlens 41. FIG. 10 also contains a table (at the bottom of FIG. 10) which discloses dimensions for typical applications of the particular embodiment of the color separation microlens shown at the top of FIG. 10.

The table at the bottom of FIG. 10 lists the very small spot sizes and separations that can be achieved with the color separation microlens of the present invention.

FIG. 11 is an isometric view similar to FIG. 6, but FIG. 11 shows a color separation microlens 53 constructed in accordance with the dual-sided, thin wafer embodiment of the present invention (the embodiment 53 shown on the right side of FIG. 2).

FIG. 11, like FIG. 6, illustrates a mode of operation in which the color separation microlens separates the spectrum of incoming light to distinct color spots.

In FIG. 11 each grating period has three spaced steps 81, 82 and 83 and produces three diffraction orders m=0, m=−1 and m=+1 at the respective spots 47, 45 and 49.

As indicated in FIG. 11, the step height of a grating is d so that the step 83 has a height d lower than the uppermost step 81 and the step 85 has a height 2d lower than the height from the uppermost step 81.

Usually the height and width of a step in the grating are constant within a grating period.

More design freedom can be obtained by allowing the step heights to be non uniform and the locations of the step jumps to be arbitrarily locating within a grating period (as will be discussed in more detail below with reference to the design equation for the color separation microlens).

FIG. 12 is an isometric view showing the dual-sided, thin wafer, color separation microlens embodiment of the present invention.

There are five steps in each grating period of the embodiment shown in FIG. 12, and the color separation microlens 53 produces five diffraction orders.

In both FIGS. 11 and 12 a substrate 91 is shown assembled at the upper, grating surface of the microlens 53. A substrate 53 is shown assembled at the refractive lens surface of the color separation microlens 53.

FIG. 12 illustrates how design freedom allows more than three spots to be generated.

FIG. 13 is an isometric view like FIGS. 11 and 12, but FIG. 13 shows a special case embodiment of the color separation microlens of the present invention in which the outside orders have the same efficiency curves so light is sent in equal intensities to the two outermost spots 50 and 52.

In this special case embodiment, the outside orders can then be reflected or absorbed so as to be rejected or eliminated.

In the FIG. 13 embodiment, detectors 61, 63 and 65 are placed under the three central spots, and absorbers 93 and 95 (or reflectors 93 and 95, or nothing) are placed under the outer two spots 50 and 52. The efficiencies for the two outer spots 50 and 52 are identical.

This FIG. 13 demonstrates the application of a color separation microlens as, for example, a laser line rejector. All of the energy at a selected wavelength can be split and sent to the two outer orders ($\lambda^*$) thus rejecting the energy at that wavelength. This is a novel application of the color separation microlens of the present invention for rejecting all light of a particular wavelength (and a majority of light in a band around that wavelength).

FIGS. 14–18 are side elevation, cross-sectional views of the embodiment shown in FIG. 14.

Each of FIGS. 15, 16, 17 and 18 has been simplified to illustrate how passed light is transmitted through the color separation microlens 41 and sent to the focused, diffraction spots at the focal plane.

FIG. 15 shows how the energy to be rejected is confined to the two outermost orders and is split to equal intensity spots at the outer ends of the line of spots at the focal plane so that this light can be rejected.

FIGS. 16, 17 and 18 show how energy to be detected is sent to the other three orders, each order corresponding to a central spot.

FIGS. 19–25 are a series of graphs which show the effects of changing various parameters which affect the efficiency curves for color separation microlenses constructed in accordance with the present invention.

FIG. 19 shows the efficiency curves for certain parameters of the design equation for a particular design of a color separation microlens. The efficiency curves are shown in FIG. 19 for the parameters k=2, L=3, and $\bar{\lambda}$=0.54 micrometers.

The design equation will be set out below and will be discussed in more detail below.

This FIG. 19 is also useful as a basis for comparison for the other FIGS. 20–25.

FIGS. 20 and 21 are graphs like FIG. 19 but showing the effect of altering the parameter $\bar{\lambda}$ in the efficiency curve.

FIGS. 20 and 21 show in particular that changing the value of $\bar{\lambda}$ changes the relative positions of the efficiency curves. The value of $\bar{\lambda}$ denotes the wavelength at which the peak value of the zero order efficiency curve will lie.

The parameters for FIG. 20 are k=2, L=3, and $\bar{\lambda}$=0.5 micrometers.

The parameters for FIG. 21 are k=2, L=3, and $\bar{\lambda}$=0.6 micrometers.

The relative positions of the efficiency curves are controlled by the parameter $\bar{\lambda}$.

FIGS. 22 and 23 are graphs like FIGS. 19–21 but show the effect of altering the parameter k (which is always an integer). These FIGS. 22 and 23 show in particular that as k is increased the efficiency curves are compressed toward $\bar{\lambda}$. Not shown, but also true, is the fact that when k is decreased, the efficiency curves expand around $\bar{\lambda}$. The parameters for FIG. 22 are k=3, L=3, and $\bar{\lambda}$=0.5 micrometers. The parameters for FIG. 23 are k=4, L=3, and $\bar{\lambda}$=0.54 micrometers.

The widths of the efficiency curves are controlled by the parameter k.

FIGS. 24 and 25 are graphs like FIGS. 19–23 but show the effect of altering the parameter L (an integer).

FIGS. 24 and 25 show in particular that only orders whose magnitudes are less than or equal to L/2 ($|m| \leq L/2$) have significant efficiency amplitudes. When L is even, the $\pm L/2$ orders have identical efficiency curves.

The parameters for FIG. 24 are k=2, L=4, and $\bar{\lambda}$=0.54 micrometers.

The parameters for FIG. 25 are k=2, L=5, and $\bar{\lambda}$=0.54 micrometers.

The orders which have significant efficiency amplitudes are controlled by the parameter L.

Before discussing FIGS. 26–28, it is believed a bit of background will be helpful to explain some information which is illustrated in these figures.

Any perceived color can be matched by a combination of three independent colors. These independent colors are referred to as primaries. Most often, the primaries are chosen to be particular shades of red, green, and blue so these primaries are often referred to as RGB primaries.

Since there are many choices of what constitutes a red, green, or blue primary, the color matching curves are dependent on the particular choice of primaries that is made.

The color content of a set of primaries is customarily displayed on a chromaticity diagram.

FIG. 26 is a chromaticity diagram which shows the chromaticities of the spots produced by a color separation microlens designed to give a maximum color gamut with three primaries. The primaries correspond to red, green, and blue colors. Any color which lies within the color gamut (i.e., within the polygon with vertices described by the primaries) can be reproduced for display by appropriately adjusting the amounts of the primaries. The calculation made to design this element assumed that the element was illuminated by an equal energy spectrum (i.e., an equal amount of energy at each wavelength across the visible band). If the spectrum of the illuminating light can be controlled (e.g., by choosing proper phosphors for a fluorescent lamp) then an even larger color gamut can be obtained. Controlling the spectrum of the illuminating light gives a larger design freedom for the color gamut.

This FIG. 26 shows the attainable color gamut for a display which uses three primaries and an equal energy spectrum for the illumination light.

The attainable color gamut is dependent upon the design parameters chosen.

FIG. 27 is a graph like FIG. 26 but showing the chromaticities of the spots produced by an color separation microlens designed to give a maximum color gamut with five primaries. The primaries correspond to red, yellow, green, blue and violet colors.

This FIG. 27 shows the attainable color gamut for a display which uses five primaries and an equal energy spectrum for the illumination light.

The attainable color gamut is dependent upon the design parameters chosen.

The design equation for the color separation microlens is actually the equation that describes the spectral efficiencies for a particular design. The efficiency curve for the mth order is given by the equation $$\eta_m(\lambda) = \left\{ \text{sinc}(m/L) \frac{\sin[L\pi(k\bar{\lambda}/\lambda - m/L)]}{L\sin[\pi(k\bar{\lambda}/\lambda - m/L)]} \right\}^2$$

where m is the diffraction order number, k is the overphasing parameter (always an integer), L is the number of steps in a period of the grating, and $\bar{\lambda}$ is the "design" wavelength. The sinc function is described by $\text{sinc}(x)=\sin(\pi x)/(\pi x)$. Note that k and $\bar{\lambda}$ always appear as a product in the design equation, so in fact $k\bar{\lambda}$ is a single parameter rather than two independent parameters. The reason this parameter is split up into two parameters is that it is much easier to describe the dependencies of the efficiency curves in terms of two separate parameters rather than a combined parameter. $k\bar{\lambda}$ is related to physical parameters through $d=k\bar{\lambda}/(n-1)$ where d is a step height of the grating and n is the index of refraction of the material the color separation microlens is made of. Note that if the material is dispersive (i.e., the refractive index depends on the wavelength) then since d is fixed and k is always an integer, $\bar{\lambda}$ will in general be a function of wavelength.

In brief, the design parameters affect the efficiencies in the following way:

The design wavelength specifies where the peak efficiency of the zero order will fall. The overphasing parameter describes how compressed or expanded the efficiency curves will be. The number of steps controls which orders (those with magnitudes less than or equal to L/2) will have significant energy.

The design equation assumes that the height and width of a step in the grating are constant within a grating period. These assumptions can be relaxed to allow more design freedom by allowing the step heights to be non-uniform and the locations of the step jumps to be arbitrarily located within a grating period. When this is done, better designs can be obtained, but the description of the efficiencies is much more complicated.

Two parameters which are not included in the design equation are the number of grating periods across an element, N, and the focal length of the element, $f$. The efficiencies do depend on N, but when $N \geq 4$, the effect is largely negligible. Since the efficiencies do not depend on $f$, the focal length allows an independent design freedom for specifying the spot sizes and separations.

FIG. 28 is a plot which shows the color matching curves corresponding to a color separation microlens which has the efficiency curves of FIG. 26.

Color matching curves tell how much of each primary is required to simulate a given color in the visible spectrum.

To match a color in the spectrum, we simply read off the values of the red, green and blue curves at the chosen wavelength.

For example, at $\lambda=0.5$ μm, we read off r=−0.29, g=1.12, b=0.18 which means that to produce the sensation of a spectral color of 0.5 μm, we need to combine the primaries in the ratios −0.29:1.12:0.18. Since a negative amount of primary (r=−0.29 in the example) is not physically attainable, what is often done for color display is simply to ignore the negative contribution, or to substitute a color of appropriate hue with high saturation for the desired color.

To match a non-spectral color, the color is broken up into its spectral components, the color matching values for the spectral components are calculated and summed according to the weighting of the spectral components.

Once a set of primaries has been chosen for a display, the color matching curves specify the amounts of the primaries necessary for reproducing any color. In a physical set-up, the color matching curves can be used as a basis for designing a color separation microlens used for color pickup in a CCD camera. If a color separation microlens can be designed whose efficiency curves closely match the shapes of the color matching curves, then the color information from any scene can be obtained by imaging the scene using an array of color separation microlenses.

Matching efficiency curves to color matching curves gives a means of using the color separation microlens to obtain color content from an image.

In accordance with another embodiment of the present invention, a plurality of the color separation microlens are arranged in an array, and a back illuminating light source is aligned with the color separation microlenses to supply a spectral band of light to the color separation microlenses.

Polarization means are positioned between the back illuminating light source and the color separation microlenses for polarizing all of the light entering the color separation microlenses.

A liquid crystal means are aligned with each of the color separation microlenses with the liquid crystal means positioned on a side of the color separation microlens opposite the polarization means. The liquid crystal means are selectively controllable for modulating the separated colors in the distinct spots produced by the aligned color separation microlenses.

An amorphic lens means are aligned with the liquid crystal means for displaying the color as modulated by the liquid crystal means.

The array of the color separation microlens and the associated, aligned elements produce a flat panel display for displaying color images.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A one-piece, unitary, color separation and focusing microlens which produces selected color dispersion of an incoming spectral band by diffraction orders and which also focuses the selected, dispersed diffraction orders into a plurality of separate, distinct spots in a common focal plane of the microlens, said color separation microlens comprising, dispersive means for separating colors of an incoming spectral band by a plurality of diffraction orders, focusing means located with respect to the dispersive means for focusing the separated colors of the plurality of diffraction orders into a plurality of separate, distinct spots in a common focal plane, said focal plane being spaced from the microlens by the focal distance of the microlens for said spectral band, and said dispersive means and focusing means being fabricated in a one-piece, unitary, micro-optical element.

2. The invention defined in claim 1 wherein the dispersive means comprise a stepped color separation grating which separates the colors of the incoming spectral band by diffraction orders and wherein the color contents of the focused spots contain contributions from all wavelengths in the spectral band with the weighting of the spectral content dependent on the diffraction order.

3. The invention defined in claim 2 wherein the focusing means comprise a refractive lens having a lens surface for focusing the separated colors in separate, distinct spots in the common focal plane.

4. The invention defined in claim 3 wherein the stepped grating and the lens surface are combined in a single surface on the one-piece, unitary optical element.

5. The invention defined in claim 3 wherein the optical element is a dual-sided, thin wafer having the stepped grating on one side of the wafer and the lens surface on the other side of the wafer.

6. The invention defined in claim 1 including detector means at each separate, distinct, focused spot in the common focal plane for detecting the energy in the spot.

7. The invention defined in claim 1 wherein the stepped grating has a plurality of periods and is fabricated to have a selected number of spaced steps in each grating period and wherein the number of steps is related to the number of diffraction orders produced by the color separation microlens.

8. The invention defined in claim 7 wherein there are three steps in each grating period and the color separation microlens produces three diffraction orders.

9. The invention defined in claim 7 wherein there are five steps in each grating period and the color separation microlens produces five diffraction orders.

10. The invention defined in claim 7 wherein there are four steps in each grating period and wherein the color separation microlens produces four diffraction orders and five separate, distinct, focused spots with two outer peripheral spots having the same efficiency curves.

11. The invention defined in claim 1 wherein the diffraction orders have efficiency curves of efficiency related to wavelength and wherein the relative positions of the efficiency curves with respect to one another are controlled by a selected, design wavelength parameter for which the color separation microlens has been designed.

12. A one-piece, unitary, color separation microlens which produces selected color dispersion of a spectral band by diffraction orders and which also focuses the selected, dispersed diffraction orders, said color separation microlens comprising, dispersive means for separating colors of a spectral band by diffraction orders, focusing means for focusing the separated colors in separate, distinct spots in a common plane, said dispersive means and focusing means being fabricated in a one-piece, unitary, micro-optical element, and wherein the diffraction orders have efficiency curves of efficiency related to wavelength and wherein the relative positions of the efficiency curves with respect to one another are controlled by a selected, design wavelength for which the color separation microlens has been designed, and wherein the color separation microlens is fabricated to comprise an overphasing parameter which is always an integer and which causes the efficiency curves to become compressed toward the design wavelength as the overphasing parameter is increased and which causes the efficiency curves to expand around the design wavelength when the overphasing parameter is decreased.

13. The invention defined in claim 12 wherein the color separation microlens is fabricated to have a parameter which is the number of steps in a period of the grating and wherein the number of steps controls which orders will have significant energy.

14. The invention defined in claim 13 wherein the color separation microlens is fabricated to have a design equation in which the efficiency curve for the $m^{th}$ order is as follows:

$$\eta_m(\lambda) = \left\{ \text{sinc}(m/L) \frac{\sin[L\pi(k\bar{\lambda}/\lambda - m/L)]}{L\sin[\pi(k\bar{\lambda}/\lambda - m/L)]} \right\}^2$$

and wherein m is the diffraction order number, k is the overphasing parameter (always an integer), L is the number of steps in a period of the grating, and $\bar{\lambda}$ is the design wavelength.

15. A one-piece, unitary, color separation microlens which produces selected color dispersion of a spectral band by diffraction orders and which also focuses the selected, dispersed diffraction orders, said color separation microlens comprising, dispersive means for separating colors of a spectral band by diffraction orders, focusing means for focusing the separated colors in separate, distinct spots in a common plane, said dispersive means and focusing means being fabricated in a one-piece, unitary, micro-optical element, and wherein the grating has a plurality of periods and is fabricated to have a selected number of spaced steps in each grating period and wherein the number of steps is related to the number of diffraction orders produced by the color separation microlens, and wherein the diffraction orders have efficiency curves of efficiency controlled by the specific heights and widths of individual steps in a grating period.

16. The invention defined in claim 15 wherein the width of each step in a grating period is the same, but the heights of the steps in a grating period are non-uniform.

17. The invention defined in claim 15 wherein the height of each step in a grating period is the same, but the widths of the steps in a grating period are non-uniform.

18. A one-piece, unitary, color separation microlens which produces selected color dispersion of a spectral band by diffraction orders and which also focuses the selected, dispersed diffraction orders, said color separation microlens comprising, dispersive means for separating colors of a spectral band by diffraction orders, focusing means for focusing the separated colors in separate, distinct spots in a common plane, said dispersive means and focusing means being fabricated in a one-piece, unitary, micro-optical element, and wherein the dispersive means comprise a color separation grating which separates colors of a spectral band by diffraction orders and wherein the color content of the focused spots contain contributions from all wavelengths in the spectral band with the weighting of the spectral content dependent on the diffraction order, and wherein the focusing means comprise a refractive lens having a lens surface for focusing the separated colors in separate, distinct spots in a common plane, and including a plurality of the color separation microlenses arranged in an array, a back illuminating light source means aligned with the color separation microlenses for supplying a spectral band of light to the color separation microlenses, polarization means positioned between the back illuminating light source means and the color separation microlenses for polarizing all of the light entering the color separation microlenses, a liquid crystal means aligned with each of the color separation microlenses on a side opposite the polarization means and selectively controllable for modulating the separated colors in the distinct spots produced by the aligned color separation microlens, and anamorphic lens means aligned with the liquid crystal means for displaying the color as modulated by the liquid crystal means, whereby the array of the color separation microlenses and associated, aligned elements can produce a flat panel display for displaying color images.

\* \* \* \* \*